(12) United States Patent
Grunzinger

(10) Patent No.: US 12,269,008 B2
(45) Date of Patent: Apr. 8, 2025

(54) MICROPOROUS POLYMERIC FILTERING ARTICLE WITH SORPTION PARTICLES

(71) Applicant: Stephen James Grunzinger, Stillwater, MN (US)

(72) Inventor: Stephen James Grunzinger, Stillwater, MN (US)

(73) Assignee: Stephen James Grunzinger, Stillwater, MN (US)

( * ) Notice: Subject to any disclaimer, the term of this patent is extended or adjusted under 35 U.S.C. 154(b) by 294 days.

(21) Appl. No.: 17/286,478

(22) PCT Filed: Nov. 12, 2019

(86) PCT No.: PCT/US2019/061034
§ 371 (c)(1),
(2) Date: Apr. 18, 2021

(87) PCT Pub. No.: WO2020/102259
PCT Pub. Date: May 22, 2020

(65) Prior Publication Data
US 2021/0346865 A1    Nov. 11, 2021

Related U.S. Application Data

(60) Provisional application No. 62/760,180, filed on Nov. 13, 2018.

(51) Int. Cl.
| | | |
|---|---|---|
| *B01J 20/26* | (2006.01) | |
| *B01D 53/02* | (2006.01) | |
| *B01J 20/04* | (2006.01) | |
| *B01J 20/06* | (2006.01) | |
| *B01J 20/20* | (2006.01) | |
| *B01J 20/22* | (2006.01) | |
| *B01J 20/28* | (2006.01) | |
| *C02F 1/28* | (2023.01) | |
| *C02F 101/30* | (2006.01) | |

(52) U.S. Cl.
CPC ............ *B01J 20/265* (2013.01); *B01D 53/02* (2013.01); *B01J 20/043* (2013.01); *B01J 20/06* (2013.01); *B01J 20/205* (2013.01); *B01J 20/226* (2013.01); *B01J 20/261* (2013.01); *B01J 20/262* (2013.01); *B01J 20/28026* (2013.01); *B01J 20/2808* (2013.01); *B01J 20/28083* (2013.01); *B01J 20/28085* (2013.01); *C02F 1/288* (2013.01); *B01D 2253/102* (2013.01); *B01D 2253/1124* (2013.01); *B01D 2253/202* (2013.01); *B01D 2253/204* (2013.01); *B01D 2253/25* (2013.01); *B01D 2253/308* (2013.01); *C02F 1/283* (2013.01); *C02F 1/285* (2013.01); *C02F 2101/308* (2013.01)

(58) Field of Classification Search
CPC ........ B01J 20/26; B01J 20/265; B01J 20/043; B01J 20/06; B01J 20/205; B01J 20/226; B01J 20/261; B01J 20/262; B01J 20/28026; B01J 20/2808; B01J 20/28083; B01J 20/28085; B01D 53/02; B01D 2253/102; B01D 2253/25; B01D 2253/308; C02F 1/288; C02F 1/283; C02F 1/285; C02F 2101/308
USPC ......................................................... 502/402
See application file for complete search history.

(56) References Cited

U.S. PATENT DOCUMENTS

2018/0043656 A1    2/2018  Song et al.

FOREIGN PATENT DOCUMENTS

| CN | 103517759 B | * | 9/2015 | ......... B01D 39/2079 |
| WO | WO-03008068 A1 | * | 1/2023 | ......... B01D 39/2055 |

OTHER PUBLICATIONS

Gel-emulsion templated polymeric monoliths for efficient removal of particulate matters; Chemical Engineering Journal 339 (2018) 14-21.

* cited by examiner

*Primary Examiner* — Edward M Johnson

(57) ABSTRACT

The disclosure describes an article for removing undesired chemical ions or compounds from gas and fluid streams when the stream comes into contact with the article. The article is a porous polymeric matrix having a sorption particle within the porous polymeric matrix structure, the sorption particle is capable of removing the undesired chemical ion or compound.

22 Claims, No Drawings

MICROPOROUS POLYMERIC FILTERING ARTICLE WITH SORPTION PARTICLES

PRIORITY CLAIM

This application claims priority to U.S. Provisional Application No. 62/760,180, filed Nov. 13, 2018, the contents of these applications are hereby incorporated by reference in their entirety.

FIELD OF THE INVENTION

The present invention relates to an article that is a porous polymeric matrix and a plurality of a sorption particle. The article is for removing chemical compounds, chemical ions or chemical components from gas and fluid streams. The porous polymer matrix is a durable material comprising polyvinyl chloride or chlorinated polyvinyl chloride capable of having a flow rate of gas or fluids through its structure resulting from a bicontinuous structure.

BACKGROUND OF THE INVENTION

Ion exchange/complexation is widely used as a technique for removing both organic and inorganic species from water. These techniques conventionally involve passing water through a packed bed or column of ion exchange or complexing resin. Target species are removed by being adsorbed or complexed onto the resin. Such resins are commonly used for removing contaminants from water but require long contact time or residence times in columns containing the ion exchange/complexing resin. Short contact times often reduce the usefulness of ion exchange/complexing resin.

Molecular sieves have been used for filtering purposes in various industries. Generally, molecular sieves are made from zeolites, clays, silicas, graphene and activated carbon. The molecular sieves are often used in spherical form due to the benefits of having a spherical structure for improving contact surfaces. Membranes are also utilized as sieves to remove chemical components from gases and fluids. Most of these materials are not able to withstand harsh environments including acidic or basic environments without breaking down.

Filters made from paper or cellulose-based materials that are very easy to destroy and air flow or water flow situations and do not provide the robust structure to survive long-term. It is desired to have a durable filter structure capable of incorporating but still exposing sorption particles to interact with gases or liquids.

Specific uses of these filters are for removing components from gas and fluid streams that are otherwise difficult to remove period or costly to remove. For example, removing soluble phosphorus or phosphates from water streams has been a difficult process for nonpoint sources such as drainage from agricultural fields. U.S. Pat. No. 3,499,837 uses diatomaceous silica as a substrate to deposit iron oxide to remove phosphates from water.

U.S. Pat. No. 5,628,943A discusses using silicone resin, phenol formaldehyde resin, polyurea melamine and epoxy resin or combinations thereof mixed with activated carbon, ferrous sponge iron, ferrous elemental iron powder and zeolites that is cured with a catalyst such as toluene Sulfonic acid, benzenesulfonic acid and sulfuric acid and air is forced through the mixture to form the porous structure.

Processes for the manufacture of polymer beads incorporating magnetic iron oxide particles are known. For example, U.S. Pat. No. 2,642,514 discloses an ion exchange process using a mixed ion exchange resin. One of the ion exchange resins is a magnetic resin. The magnetic resin is produced by polymerizing a reagent mix until a viscous syrup is obtained. Magnetite is added to the viscous syrup and the mixture is agitated to mix in the magnetite. The mixture is cured to form a hard resin that is subsequently ground to form irregular particles of magnetic resin.

There continues to be a desire to provide functional filters materials that remove undesired ions, chemicals, and compounds from the gas or fluid streams. The functional filters must meet performance criteria for removing undesired ions with realistic in-use conditions (within the flow rate of the gas or fluid stream). The functional filter must also be made by common commercial manufacturing methods without deactivating or otherwise diminishing the activity of the active materials used to remove the undesired ions, chemicals, and compounds.

SUMMARY OF THE INVENTION

The present invention relates to an article comprising a porous polymeric matrix, the matrix comprising a polyvinyl chloride or chlorinated polyvinyl chloride polymer and a plurality of sorption particles, the sorption particles are present at less than 10 PHR of the polyvinyl chloride or chlorinated polyvinyl chloride polymer.

The present invention relates to an article comprising a porous polymeric matrix, the matrix comprising a polyvinyl chloride or chlorinated polyvinyl chloride polymer and a plurality of sorption particles, the sorption particles are present between 10 and 40 PHR of the polyvinyl chloride or chlorinated polyvinyl chloride polymer.

The present invention relates to an article comprising a bicontinuous structure of a polyvinyl chloride or chlorinated polyvinyl chloride and a polyethylene oxide polymer, the polyethylene oxide polymer having an average weight average molecular weight less than 100,000, wherein the article further comprising a plurality of a sorption particle the sorption particle being present in less than a hundred PHR of the bicontinuous structure and having a nominal particle size of between 1 nm and 100 microns.

The present invention relates to an article comprising a bicontinuous structure of polyvinyl chloride or chlorinated polyvinyl chloride and a polyethylene oxide polymer, the polyethylene oxide polymer having an average weight average molecular weight less than 100,000, wherein the bicontinuous structure comprises a nominal channel size of polyethylene oxide polymer between 100 microns and 1 nm, the article further comprising a plurality of sorption particles, the sorption particles are distributed in the polyethylene oxide polymer and the nominal sorption particle size is selected to be greater than the nominal channel size.

The present invention relates to an article comprising a bicontinuous structure of polyvinyl chloride or chlorinated polyvinyl chloride and a polyethylene oxide polymer, the polyethylene oxide polymer having an average weight average molecular weight less than 100,000, wherein the bicontinuous structure comprises a nominal channel size of polyethylene oxide polymer between 100 microns and 1 nm, the article further comprising a plurality of a sorption particle, the sorption particles are distributed in the polyethylene oxide polymer and the nominal sorption particle size is selected to be less than the nominal channel size.

The present invention relates to a process of removing an undesired compound or material from a gas stream comprising passing a gas stream with the undesired compound through a filter comprising a polyvinyl chloride or chlorinated polyvinyl chloride three-dimensional microporous matrix, the matrix comprising a metal organic framework The present invention relates to a process of removing an undesired compound of material from a liquid stream comprising passing a liquid stream with the undesired compound through a filter comprising a polyvinyl chloride or chlorinated polyvinyl chloride three-dimensional microporous matrix, the matrix comprising a plurality of a sorption particle selected as iron oxide.

DETAILED DESCRIPTION OF THE INVENTION

The present invention relates to an article. The article comprises a porous polymeric matrix and an effective amount of a sorption particle. The article structure results from a bicontinuous structure wherein the porous polymer matrix polymer is admixed with a water-soluble polymer and a plurality of sorption particles. The water-soluble polymer is capable of being removed from the bicontinuous structure leaving the porous polymer matrix. Stated another way, the porous polymer matrix is isotropically porous through microchannels in both the vertical and horizontal directions. The bicontinuous phase structure has two distinct phases (porous polymer matrix polymer and a water-soluble polymer), where each phase has an uninterrupted pathway through the entire volume of the material. If the first phase, the porous polymer matrix polymer, is interrupted, the material will fall apart when placed in water. If the second phase, the water-soluble polymer phase, is interrupted, the material will not be gas or fluid permeable. The combination of structural stability and the ability for gas or fluids to diffuse through the porous polymer matrix is an indication of a bicontinuous phase structure. The bicontinuous phase structure is isotropic in both the vertical direction and the horizontal direction. There is structure is random and does not orient in any particular direction.

Other suitable co-continuous structures include interconnected circular domain structures or interconnected elliptical domain structures of the second phase (minor component) in the first phase (major component). Lamellae structures are suitable should the resulting co-continuous phase structure allows for the first phase to have an interconnected structure and the second phase to have an interconnected structure.

The porous polymer matrix comprises one or more materials including but not limited to polyvinyl chloride, chlorinated polyvinyl chloride or acrylonitrile butadiene styrene (ABS). The materials used for the porous polymer matrix has a first processing temperature. Polyvinyl chloride has a reported melting point of 212 deg F. to 500 deg F. (100 deg C. to 260 deg C.) which would be equal to or less than the processing temperature. K values have been used to describe polyvinyl chloride. Suitable K values may be selected from about 35 and about 80, such as about 50 to about 80, such as about 60 to about 75. Chlorinated polyvinyl chloride may have a processing temperature from about 180 to about 200 deg C. The K value of chlorinated polyvinyl chloride may be between about 50 and about 70, such as about 53 to about 55 and the chlorine content may be between about 60 and about 70%, such as about 66% to about 68%. Use of chlorinated polyvinyl chloride may require the further use of stabilizers and lubricants, such as montan wax, for processability purposes.

The porous polymer matrix has a porous structure that is a network of interconnected channels within the polymer matrix. The pore and channel nominal sizes are 100 microns or less, preferably 100 microns to 10 nanometers. The channels and pores are robust, mechanically and chemically stable.

Nominal Pore Size Determination Method

Typically, nominal pore sizes may be determined by TEM (Transmission Electron Microscope) or Raman spectroscopy method, although other methods are known in the art. For purposes of the present nominal pore sizes, TEM is used. The pore size (or width) is referred to the smallest dimension within a given pore shape, that is, the diameter for a cylindrical pore and for irregular pores, the smallest distance.

Porosity ($\varepsilon$) is between about 10% and about 80%, such as 10%, 15%, 20%, 25%, 30%, 35%. 40%, 45%, 50%, 55% 60%, 65%, 70%, 75% and 80%. In some embodiments, porosity is between 10% and 20%. In some embodiments, porosity is between 20% and 30%. In some embodiments, porosity is between 15% and 35%. For a single phase material, such as the porous polymer matrix, the value of V can be obtained from the difference between the volume of the solid (computed from its lattice density) and the apparent total bulk volume ($V_T$) of the sample:

$$(\varepsilon) = V_v / V_T$$

Flow Rate of Article

The nominal pore size of the porous polymer matrix or the porosity of the porous polymer matrix should be such that a low rate using deionized water is between 0.01 and 0.5 (mL/min)/in2, such as 0.01-0.05 (mL/min)/in2, such as 0.1-0.5 (mL/min)/in2. Flow rate is measured with a sample size of ⅛ inch in thickness and ⅞ inches in diameter; fluid used for flow rate is deionized water, delivered at a fluid pressure of 1 psi.

The formation of pores (2 dimensional aspect) or channels (3 dimensional aspect) in the article are a result of a bicontinuous network formed by the polymer such as polyvinyl chloride or chlorinated polyvinyl chloride and a second polymer. The bicontinuous phase structure is isotropic in both the vertical direction and the horizontal direction. There is structure is random and does not orient in any particular direction. The second polymer that is water soluble such as polyethylene glycol, polyethylene oxide or polyvinyl alcohol. The second polymer has a second melting point between about 40 deg C. to about 70 deg. C. For example, polyethylene oxide having an average weight average molecular weight of 100,000 has a melting point between about 65 deg C. to about 75 deg. C. Polyethylene oxide with an average weight average molecular weight of about 200,000 has a melting point of about 63 deg C. to about 66 deg C. Polyethylene oxide with an average weight average molecular weight of 8000 has a melting point between about 60 deg C. to about 63 deg C. Polyethylene oxide with an average weight average molecular weight of 6000 has a melting point between about 58 deg C. to about 62 deg. C. Polyethylene oxide with an average weight average molecular weight of 3000 has a melting point between about 50 deg C. to about 60 deg. C.

Polyethylene oxide should have an average weight average molecular weight more than 61, such as above 100, such as above 500, such as above 600, such as above 1000, such as about 3000, such as about 8000. The polyethylene oxide molecular weight should be less than 200,000, such as less than 150,000, such as less than 100,000, such as less than 80,000. The polyethylene oxide molecular weight is selected from between about 100) to about 100,000, such as about 1000 to 6000, such as about 1000 to about 5000, such as about 6000 to 10,000, such as about 10,000 to 50,000.

The nominal pore sizes and nominal channel sizes will be dependent upon the selection of the water soluble polymer used to form the article. The second polymer that is water soluble is used to form a bicontinuous structure with the polymer matrix material. The article is formed when the polymer matrix material and a second polymer are heated to above both the first melting point (polymer matrix material melting point) and the second melting point (the second polymer), mixed to form a polymeric mixture and then allowed to cool below both the first melting point and the second melting point. Upon cooling, the polymeric mixture phase separates via spinodal decomposition and forms a bicontinuous network that is isotropically porous when the water-soluble polymer is extracted.

The present invention relates to an article comprising a bicontinuous structure of polyvinyl chloride or chlorinated polyvinyl chloride and a polyethylene oxide polymer, the polyethylene oxide polymer having an average weight average molecular weight less than 100,000, wherein the bicontinuous structure comprises a nominal channel size of polyethylene oxide polymer between 100 microns and 1 nm, the article further comprising a plurality of sorption particles, the sorption particles are distributed in the polyethylene oxide polymer and the nominal sorption particle size is selected to be less than the nominal channel size. The polyethylene oxide polymer is selected to have an average weight average molecular weight less than 100,00), such as between about 1000 to about 100,000, such as about 1000 to 6000, such as about 1000 to about 5000, such as about 6000 to 10,000, such as about 10,000 to 100,000.

The water soluble polymer may be present from 0.01 wt % to 90 wt % by weight of the co-continuous structures before any exposure to any water, such as 0.01 wt % to 50 wt %, such as from 0.01 wt % to 30 wt %, such as 5 wt % to 30 wt %, such as 10 wt % to 30 wt %, such as 15 wt %, 20 wt %, 25 wt % and 30 wt %.

Micropores can be formed in the bicontinuous structure through the removal of the water soluble polymer. The water soluble polymer may be extracted warm water bath (more than 50 deg C., preferably more than 60 deg C., such as about 60 deg C. to about 80 deg C., such as about 70 deg C. or through the application of steam to the bicontinuous structure. The water soluble polymer crystallites to melt at the increased temperature, allowing the water soluble to flow out of the polymer matrix.

If water cannot be used because of the selection of the sorption particle (i.e., the sorption particle is unable to be in contact with water without causing the sorption particle to become inactive), the other options for extraction may be suitable that have low or no reactivity with the sorption particle. One embodiment is the sorption particles are selected as the NGP, which forms hydrogen in the presence of water. If the generation of hydrogen is the reason for selecting NGP, then exposure to water is undesired. The extraction of the water soluble polymer can be selected to be a solvent of low reactivity (isopropanol) to the NGP or selected to have no reactivity (hexane) to the NGP. The polymer matrix material does have a solvent resistivity toward both of these solvents and the microstructure should not be impacted by either replacement media.

The inclusion of the sorption particles will concentrate in the microchannel portion of the porous polymeric matrix formed by the water-soluble polymer within the porous polymer matrix polymers rather than within the porous polymeric matrix polymer or dispersed uniformly throughout the combination. Porous polymer matrix polymers such as PVC are relatively hydrophobic materials, compared to the water-soluble polymer, with limited flexibility along the chain length to effectively utilize the dipole from the carbon-chlorine bond to interact with other materials. Water-soluble polymers, such as PEO, conversely, is a well-known amphiphile that is highly flexible and able to complex with a wide range of materials. The vast majority of metal oxide particles, such as aluminum oxide, have a high-energy, hydrophilic surface. If the particles are in air or vacuum, the high-energy surface tends to cause agglomeration especially as the particle size decreases. Surface passivation techniques or chemistry are generally used to avoid agglomeration and maximize surface area.

Therefore, it is reasonable to conclude that given a mixture of PVC, PEO, and a sorption particle, that the water soluble polymer, such as PEO, will preferentially interact with the sorption particle. During processing, it is believed that the PEO will uniformly distribute the sorption particle within the mixture (sorption particle, PEO, and PVC). Then once the solution cools and spinodal decomposition occurs, the sorption particle will become concentrated in the PEO microchannels. Since the sorption particle is coated with PEO, it will separate to that phase preferentially. Due to the particle size distribution of the sorption particle compared to the microchannel, the sorption particle will be 'stuck' in the microchannel as parts of the sorption particle will be 'embedded' within the PVC matrix, bridging the microchannel. Extraction of the PEO in part, or quantitatively, by a water or non-water solvent will result in sorption particle that is accessible by a fluid (gas or solution) for interaction.

The PEO supports the majority of particles to be de-aggregated and that the particles bridge multiple channels and that very few, if any, particles will be wholly in the PVC and isolated from the pores.

As used herein, "ion exchange" or 'ionic adsorption" refers to the interaction between a charged ion in an undesired material and a charged ion in the sorption particles that is reversible. As used herein, "chemisorption" or "chemical adsorption" refers to the formation of covalent bonds which are generally understood to refer to a bond in which electrons are shared. The covalent bond is generally not considered to be reversible under conditions in which they were formed, although under certain conditions the starting material (i.e., the material that existed before covalent bond formation) can be regenerated by the addition of an appropriate reactant. As used herein, "physisorption" or 'physical adsorption" refers to the adhesion to a surface by intermolecular forces (van der Waals forces), such as the undesired material to the surface of the sorption particle. As used herein, "chelation" means the formation two or more covalent bonds with a polydentate ligand and a single atom. As used herein, "catalysis" means the process by which a material (catalyst) increases the rate of a reaction without modifying the overall standard Gibbs energy change in the reaction.

Including sorption particles into the formation of the microporous structure can provide an exposure of the sorption particles to the gas or liquid streams needing components removed while still keeping the sorption particles located in a static position. The selection of the sorption particle is dependent upon the material, ion, compound or chemical desired to be removed (undesired material). The mechanisms for the removal of the undesired material can be ion exchange, chemisorption, physisorption, chelation or catalysis. Sorption particles are selected to be reversible such that the undesired material is recovered or irreversible and the undesired material is altered and is not recoverable. As used herein, an effective amount of a sorption particle means that the sorption particle is present at a PHR suitable to reduce the amount or concentration of the undesired material from a fluid as it comes into contact with the sorption particle.

The average particle size of the sorption particle is between about 100 microns to about 10 nanometers. As used herein 'particle' may encompass particles with a single dimension in the range of 100 microns to about 10 nanometers or it can have all dimensions in the range of 100 microns to about 10 nanometers. Particles may have an irregular but generally spherical shape or a nanosheet shape with two dimensions being greater than the 100 microns to 10 nanometer range or a nanotube shape with one dimension being greater than the 100 microns to 10 nanometer range. For example, an individual graphene nanosheet, or stack of graphene nanosheets, can have a thickness dimension of about 0.4 to about 1 nm. The average particle size should be selected to be about the size or slightly larger than the nominal channel size of the porous polymer matrix. The sorption particle has a surface area. The surface area of the sorption particle is located in the channel of the porous polymer matrix or is located within the polyethylene oxide channel of the bicontinuous structure of the article.

The sorption particle is present in the article in an effective amount. The sorption particle may be present in an amount of 100 PHR or less with respect to the PVC polymer, such as from 1 PHR to 60 PHR, such as 1 PHR to 50 PHR, such as 10 PHR to 50 PHR, such as 20 PHR to 60 PHR, such as 20 PHR to 40 PHR, such as 20 PHR to 30 PHR, such as less than 60 PHR, such as 55 PHR, 50 PHR, 45 PHR, 40 PHR, 35 PHR, 30 PHR, 25 PHR, 20 PHR, 15 PHR, 10 PHR, 9 PHR, 8 PHR, 7 PHR, 6 PHR, 5 PHR, 4 PHR, 3 PHR, 2 PHR and 1 PHR. The sorption particle may be present in a weight percentage relative to the water-soluble polymer, such as the PEO. The weight percentage the sorption particle is present relative to the water-soluble polymer is from 0.01 to 50 wt/o. Such as 1 to 3) wt %, such as 5 to 10 wt %, such as 20 to 50 wt %, such as 1 to 10 wt %.

Sorption particles may be selected to be the same material or a mixture of materials. For example, a mixture of 2 or more materials may be selected as the sorption particles, such as 2 different materials, such as 3 different materials or such as 4 different materials or more.

Suitable sorption particles include metal oxides and hydroxides such as magnesium oxide, manganese oxide (MnO2, Mn2O3, Mn3O4) and manganese hydroxide (Mn(OH)4), iron oxide, copper oxide, zinc oxide, zirconium oxide, and aluminum oxide. Mixtures of metal oxides are also possible.

Silica or silicon dioxide may also be selected to be a suitable sorption particle. Montmorillonite Clay, zeolites, calcium oxide and calcium sulfate may also be suitable desiccant sorption particles.

Known adsorbing materials such as activated carbon, graphene, and boron nitride are also suitable as a sorption particle. Suitable sorption particles include absorption particles such as metal organic framework materials. Suitable metal organic framework materials include zirconium propoxide Zr(nPrO)4, zirconium carbonic acid and Basolite C300, MOF-808 (or the equivalent by in situ formation by addition of Zr(nPrO)4, tricarboxybenzene (a.k.a., trimesic acid), and NaOH as an acid scavenger), and MOF-5 (or the equivalent by in situ formation adding Zn(NO3)2, terephthalic acid, and NaOH as an acid scavenger) and Zn-MOF-74 (or the equivalent by in situ formation is proposed by adding Zn(NO3)2 and 2,5-dihydroxyterephthalic acid, and NaOH as an acid scavenger).

Nanogalvanic particles (NGP) discussed in US20190024216, "Aluminum Based Nanogalvanic Alloys for Hydrogen Generation", which is incorporated by reference including the examples, discusses aluminum based alloys which generate hydrogen very rapidly by reaction with water at room temperature. The aluminium alloys may be composed of primarily aluminum and other metals such as tin, magnesium, silicon, bismuth, lead, gallium, indium, zinc, carbon, or similar multivalent metal ions and mixtures thereof. The aluminum alloy forms the anode of a galvanic cell and is coupled with another metal acting as the cathode such as tin, magnesium, silicon, bismuth, lead, gallium, indium, zinc, carbon, or similar multivalent metal ions and mixtures thereof. The galvanic cell formed by the aluminium alloy anode and the selected cathode, each of which is selected to have different corrosion potentials. The powder is prepared by ball milling ata cryogenic temperatures rendering the material to a powder size of 50 to 100 microns. When mixed with a moisture source, the NGP produces a rapid production of hydrogen and is consumed in a relatively short duration of time (less than 10 minutes).

Suitable sorption particles include buffering materials to keep the pH in a desired range. Suitable buffering materials may include calcium carbonate; sodium bicarbonate; calcium phosphates; tricalcium phosphate carbonated calcium phosphates; magnesium hydroxide, sodium hydroxide, potassium hydroxide and/or lithium hydroxide; citric acid, oxalic acid, tartaric acid, phtalic acid, acetic acid, benzoic acid, glutaric acid, adipic acid (such as calcium hydroxyapatite or carbonated apatite), and carbonic acid and mixtures thereof.

Suitable sorption particles include chelants such as alkylenepolyamine polyacetic acids and their salts, such as EDTA. Included with the chelant would be a sufficient quantity of sodium or potassium or calcium sulfide to remove heavy metal ions such as iron, copper, nickel, chromium, lead, zinc ions.

Suitable sorption particles include catalysts such as homogeneous and heterogeneous catalysts, these catalysts may include, ruthenium, ruthenium oxide, palladium, palladium oxide, platinum, platinum oxide, cerates, manganates, mauganites, chromates, chromites, or vanadates of cobalt, nickel, cerium, iron, manganese, chromium, copper, zinc, bismuth, silver, rare earths, molybdenum, tungsten, tin, arsenic and antimony; and mangano-chromia-manganites.

EXAMPLES

Example 1A

Adding zirconium propoxide such as Zr(nPrO)4 at 50 w % relative to PEO, the PEO having an average weight average molecular weight from 1000 to 100,000, such as about 6000 to 10,000, such as about 10,000 to 50,000;

Example 1B

Adding Zr(nPrO)4 at 10 w % relative to PEO, the PEO having an average weight average molecular weight from 1000 to 100,000, such as about 6000 to 10,000, such as about 10,000 to 50,000;

Example 1C

Adding a metal oxide, such as iron oxide, from 3-8 w % relative to PEO, the PEO having an average weight average molecular weight from 1000 to 100,000, such as about 6000 to 10,000, such as about 10,000 to 50,000;

Example 1D

Adding alkylenepolyamine polyacetic acids and their salts from 1-50 wt % relative to the PEO, the PEO having an average weight average molecular weight from 1000 to 100,000, such as about 6000 to 10,000, such as about 10,000 to 50,000;

Example 1E

Adding activated carbon from 1-50 wt % relative to the PEO, the PEO having an average weight average molecular weight from 1000 to 100,000, such as about 6000 to 10,000, such as about 10,000 to 50,000;

Example 1F

Adding graphene from 1-50 wt % relative to the PEO, the PEO having an average weight average molecular weight from 1000 to 100,000, such as about 6000 to 10,000, such as about 10,000 to 50,000;

Example 1G

Adding a metal oxide and calcium carbonate from 3-8 wt % and from 1-50%, respectively to PEO, the PEO having an average weight average molecular weight from 1000 to 100,000, such as about 6,000 to 10,000, such as about 10,000 to 50,000.

Example 11H

Adding a metal oxide and activated carbon from 3-8 wt % and from 1-50%, respectively to PEO, the PEO having an average weight average molecular weight from 1000 to 100,000, such as about 6,000 to 10,000, such as about 10,000 to 50,000.

Once the composition is made, it can be extruded or injection molded into any desired shape, such as having a shape where the smallest dimension is greater than 0.01 mm, such as 1.6 mm or 3.175 mm. The article can then be exposed to water to remove the PEO from the porous polymeric matrix but leaving the sorption particle trapped within the channels of the porous polymeric matrix.

Further materials that can be included in the article are filler materials, stabilizers such as ascorbic acid and colorants. The article may be essentially free of surfactants. The article may be essentially free of solvents. The article may be essentially free of plasticizers. The article can have a three-dimensional shape where the smallest dimension is greater than 0.01 mm, such as 1.6 mm or 3.175 mm or more. The article can have a uniform surface or a non-uniform surface, including positive and negative texture, including embossing or structures extending from the article surface.

The article can be used as part of a process where an undesired material is removed from a stream when the stream passes through the article according to any embodiment herein. The process includes contacting a stream containing a first concentration of an undesired material with at least a portion of the article, the stream is converted into a modified stream where the modified stream comprises a second concentration of an undesired material, wherein the second concentration of an undesired material is less than the first concentration of an undesired material.

The stream may comprise water or a water solution. The water solution is applied to the article, the article comprising sorption particles selected as are selected as the NCP, which forms hydrogen in the presence of water. The stream may comprise a liquid (non-aqueous) stream.

The stream may comprise a gas stream. The gas stream comprises an undesired material. The undesired material of the gas stream may include $NH_3$ (g) and $Cl_2$ (g). The removal of the undesired material may be through absorption. The absorption results from the undesired material being absorbed by or being contained by the active material. The active material is selected from activated carbon, metal organic framework particles, $Zr(nPrO)_4$, $ZrO_2$ nanoparticles, and Basolite C300, MOF-808, and MOF-5 Zn-MOF-74 The undesired material may be sulfur compounds such as sulfite and sulfide compounds.

Sorption particles which are known to remove sulfur compounds may be included in the article, such as manganese oxide ($MnO_2$, $Mn_2O_3$, $Mn_3O_4$) and manganese hydroxide ($Mn(OH)_4$), iron oxide, copper oxide, zinc oxide, zirconium oxide, aluminum oxide and salts of hexacyanoferrate, such as potassium hexacyanoferrate.

The liquid stream comprises an undesired material in a first concentration. The undesired material of the liquid stream may include soluble anions such as phosphates, nitrates, and sulfates. The removal of the undesired material may be through an ionic exchange. The ion exchange results in the undesired material becoming insoluble and a second level of undesired material.

Including sorption particles into the formation of the microporous polymeric structure can provide an exposure of an effective amount of sorption particles to the gas or liquid streams containing undesired materials for removal while still keeping the sorption particles located in a static position within the microporous polymeric structure. The selection of the sorption particle is dependent upon the ion, compound, or chemical desired to be removed (undesired material) and the best mechanism for removing the undesired material such as ion exchange, chemisorption, physisorption, chelation or catalysis.

The article may comprise multiple components, each of the components comprising an effective amount of a different sorption particle. The components can be co-extruded, overmolded or connected mechanically or connected chemically. The components can be sequentially oriented (e.g., layers) or concentrically oriented (e.g., tube form) with respect to the other components.

The article may be in the form of column packing particles such as spheres, three-dimensional shapes capable of packing and leaving space between particles for fluids to flow around and through the packing particles when placed in a suitable container or column. The packing particles may be selected to be a suitable size from 0.01 mm to 10 mm in nominal diameter.

In another embodiment, it may be desired that an article comprises an effective amount of a sorption particle that is protected during the installation of the article but otherwise once in place the article allows the sorption particle to be released for topical application or targeted application. For example, it may be desired to deliver antimicrobial and antibiotic materials in a medical device that is applied to or within a human body.

An article with an effective amount of a sorption particle that is intended to be protected and then selectively released, such as after being placed or implanted in a human or animal body, such as clamps, screws, plates, clips, staples, hooks, buttons, snaps, prosthetics, grafts, injectable polymers, vertebrae discs, anchoring devices, suture anchors, septal occlusion devices, injectable defect fillers, preformed defect fillers, bone waxes, cartilage replacements, spinal fixation devices, drug delivery devices and foams. A sorption particle may comprise an antimicrobial particle that is capable of inducing microbial stasis or exhibiting microbicidal effect when present in an effective amount. Methods of determining microbial stasis or microbicidal effect are known in the art. The antimicrobial particles can be metals and metal salts, oxides, and complexes having oligodynamic properties, such as aluminum, antimony, bismuth, cerium, copper, gold, iridium, magnesium, mercury, palladium, platinum, silver, tin and zinc and their salts, oxides, complexes, and mixtures thereof. The antimicrobial particles may be the same substance or may be a mixture. The particles may have average particle sizes of up to about 100 microns. Preferably, the antimicrobial particles have average particle sizes of less than about 10 microns and most preferably less than about 4 microns. For example, the antimicrobial particles include, but are not limited to: copper and its salts, such as copper acetate, copper chloride, copper bromide, copper chlorate, copper perchlorate, copper nitrite and copper nitrate, copper sulfate, and other copper salts and complexes, and silver and its salts, such as silver acetate, silver benzoate, silver chloride, silver carbonate, silver iodate, silver iodide, silver lactate, silver laurate, silver oxide, silver palmitate, silver protein, silver sulfadiazine, silver chloride/titanium dioxide complexes, silver zeolite, and other silver salts and complexes. Other non-copper and non-silver containing antimicrobial particles also may be used.

In an embodiment for an article that selectively releases an effective amount of the sorption particle, the article comprises a bicontinuous structure with a nominal channel size, the article is comprised of a polyvinyl chloride or chlorinated polyvinyl chloride, a plurality of a sorption particle and a water-soluble polymer such as polyethylene oxide having an average weight average molecular weight less than 100,000, wherein the nominal particle size of the sorption particle is less than the nominal channel size of the bicontinuous structure.

Examples of compositions for articles according to the present disclosure, the compositions may be formed into the article by extrusion or injection molding and optionally removal of the polyethylene oxide to form a porous polymer matrix article with channels, wherein the effective amount of sorption particles remaining in the channels of the porous polymer matrix.

The article may optionally comprise calcium carbonate or calcium hydroxide. When present, the calcium carbonate or calcium hydroxide is located within the channel of the porous polymeric matrix. The nominal particle size of the calcium carbonate or calcium hydroxide is selected to be larger than the nominal channel size of the porous polymer matrix. The nominal particle size of the calcium carbonate or calcium hydroxide is selected to be larger than the nominal channel size of the polyethylene oxide channel of the bicontinuous structure.

Polymeric resin products often contain components such as surfactants and plasticizers to assist in manufacture. However, it may be preferable for the article to be essentially free of some components. In one embodiment the article is essentially free of a surfactant. In one embodiment the article is essentially free of a plasticizer. In one embodiment the article is essentially free of polyethylene oxide with an average weight average molecular weight over 500,000.

Example 2

100 PHR polyvinyl chloride with a K values may be selected from about 35 and about 80, such as about 50 to about 80, such as about 60 to about 80, such as a K value of 74.

10 PHR, 15 PHR, 20 PHR, 25 PHR, 30 PHR, 35 PHR, 40 PHR, 45 PHR, 50 PHR polyethylene oxide; average weight average molecular weight from 600, 1000, 3000, 3300, 8000, 10,000, 20,000, 50,000, 80,000, 100,000, such as 20 PHR polyethylene oxide with an average molecular weight of 3000 or 3300

0 PHR, 1 PHR, 2 PHR, 3 PHR, 4 PHR, 5 PHR, 6 PHR, 7 PHR, 8 PHR, 9 PHR, 10 PHR of calcium carbonate 0-30 PHR sorption particle; metal oxides: iron oxide, zinc oxide, manganese oxide, magnesium oxide, zirconium oxide, metal organic framework such as HKUST-1 (Basolite C300), MOF-808, MOF-5, Zn-MOF-74; ruthenium, ruthenium oxide, palladium, palladium oxide, platinum, platinum oxide; copper and its salts and complexes and silver and its salts and complexes.

Example 2A (Comparative Example)

100 phr PVC (ex Axiall 2110, K value of 74), 20 phr bis(2-ethylhexyl)phthalate [TCI], 20 phr PEO [various weight average molecular weights shown below], 4 phr RC-71 [dibutyl tin maleate, TC1]

Example 2B (Comparative Example)

10 phr PVC [ex Axiall 2110, K value of 74), 20 phr PEO (various weight average molecular weights shown below], 4 phr RC-71 (Formulation A without plasticizer)

Example 2C (Comparative Example)

100 phr PVC [ex Axiall 2110, K value of 74], 16.8 phr PEO [various weight average molecular weights shown below], 4 phr RC-71 (Formulation A without plasticizer and normalized to keep the same ratio of PVC to PEO)

Example 2D1

100 phr PVC [ex Axiall 2110, K value of 74], 25 phr PEO [20 wt %; weight average molecular weight of 3350], 2 phr ascorbic acid [ex Swansons]

Example 2D2

100 phr PVC [ex Axiall 2110, K value of 74], 25 phr polyvinyl alcohol, 2 phr ascorbic acid [ex Swansons], polyvinyl alcohol Example 2D3

100 phr PVC [ex Axiall 2110, K value of 74], 25 phr sucrose (powdered sugar), 2 phr ascorbic acid [ex Swansons]

Example 2D4

100 phr PVC [ex Axiall 2110, K value of 74], 25 phr glucose (corn syrup), 2 phr ascorbic acid [ex Swansons]

Example 2 samples were made to be 3116 inch (4.7625 mm) thick and were exposed to warm 70 deg. C. water.

Table 1 demonstrates the percent extraction of the water-soluble polymer from Example 2 comparative examples and examples embodying the formulation (without sorbent particles present) present application. As an example, given a 1 g sample weight of a material with a 20 wt % PEO formula, the expected extracted sample mass would be 0.8 g (i.e., 0.2 of PE extracted). If the measured sample weight after extraction and drying is 0.81 g, then the percent extracted is (0.19 g measured/0.2 g expected)×100=95% extracted. The higher the number, the more water-soluble polymer is extracted from the polymer matrix.

TABLE 1

| Example 2 | A | B | C | D1 | D2 | D3 | D4 |
|---|---|---|---|---|---|---|---|
| PEO 600,000 mwt | 38.2 | 72.6 | 83.2 | — | — | — | — |
| PEO 100,000 mwt | 65.6 | 84.5 | 78.5 | — | — | — | — |
| PEO 20,000 mwt | — | — | — | 87.6 | — | — | — |
| PEO 8,000 mwt | — | — | — | 89.6 | — | — | — |
| PEO 3350 mwt | — | — | — | 94 | — | — | — |
| PEO 1000 mwt | 42.6 | 65.8 | 56.1 | — | — | — | — |
| PEO 600 mwt | 51.8 | 64.4 | 56.1 | — | — | — | — |
| Polyvinyl alcohol | — | — | — | — | -2 | — | — |
| Sucrose (powdered sugar) | — | — | — | — | — | 72 | — |
| Glucose (Corn syrup) | — | — | — | — | — | — | 22.9 |

The results of Table 1 show that the average weight average molecular weight of polyethylene oxide indicated to result in different extraction results from the porous polymeric matrix. Alternative polyols to PEO (sucrose, glucose) and polyvinyl alcohol (water-soluble polymer) do not perform as well as PEO with an average weight average molecular weight above 600 and less than 100,000. The use of polyvinyl alcohol, a water-soluble polymer did not result in any extraction or at least absorbed water within the polyvinyl chloride porous matrix.

EMBODIMENTS

An article comprising porous polymeric matrix, the matrix comprising a polyvinyl chloride or chlorinated polyvinyl chloride polymer and an effective amount of a plurality of sorption particles, the sorption particle being present at less than 100 PHR of the polyvinyl chloride or chlorinated polyvinyl chloride polymer; the sorption particle being selected from an metal-organic frameworks, metal oxides, activated carbon, graphene and mixtures thereof.

An article comprising a bicontinuous structure of a polyvinyl chloride or chlorinated polyvinyl chloride and a polyethylene oxide polymer, the polyethylene oxide polymer having an average weight average molecular weight less than 100000, the article further comprising an effective amount of a plurality of sorption particles the sorption particle being present in less than 100 PHR and having a nominal particle size of between 1 nm and 100 microns.

An article comprising a bicontinuous structure of polyvinyl chloride or chlorinated polyvinyl chloride and a polyethylene oxide polymer, the polyethylene oxide polymer having an average weight average molecular weight less than 100,000, wherein the bicontinuous structure comprises a nominal channel size of polyethylene oxide polymer between 100 microns and 1 nm, the article further comprising an effective amount of a plurality of sorption particles, the sorption particles are distributed in the polyethylene oxide polymer and the nominal sorption particle size is selected to be more than the nominal channel size.

The article as described in any of the embodiments above wherein the nominal pore size is 100 microns or less, preferably 100 microns to 10 nanometers. The nominal channel size of the article in any of the embodiments described above is 100 microns or less, preferably 100 microns to 10 nanometers, such as 75 microns, 50 microns, 25 microns, 10 microns, 5 microns, 1 micron, 750 nanometers, 500 nanometers, 250 nanometers, 100 nanometers, 75 nanometers, 50 nanometers, 25 nanometers, 15 nanometers, and 10 nanometers.

The article as described in any of the embodiments above having a porosity between 10% and 80%, such as 10%, 15%, 20%, 25%, 30%, 35%, 40%, 45%, 50%, 55% 60%, 65%, 70%, 75% and 80%.

The article as described in any of the embodiments above having a three dimensional shape where in the smallest dimension is greater than 0.01 mm, such as 1.6 mm or 3.175 mm or more, in one dimension, such as a pipe, a rod, a panel having a thickness more than 0.01 mm, a hemisphere, a cube, a sphere, a cone, an ellipsoid, a torus, an octahedron, a tetrahedron and the like.

The article as described in any of the embodiments above wherein an effective amount of the sorption particle is present in the channel of the porous polymer matrix comprising polyvinyl chloride or chlorinated polyvinyl chloride. The article as described in any of the embodiments above wherein the sorption particle has a surface area, at least part of the surface area is located in the channel of the porous polymer matrix comprising polyvinyl chloride or chlorinated polyvinyl chloride.

The article as described in any of the embodiments above wherein an effective amount of the sorption particle is available to interact with a gas or fluid stream containing an undesired ion or chemical that is removed from the gas or fluid stream when contacted with the sorption particle. The article as described in any of the embodiments above wherein the sorption particle is capable of ion exchange with an undesired material, such as an undesired ion, undesired compound or undesired chemical, the undesired material is removed from a gas stream or fluid stream when contacted with the sorption particle. The article as described in any of the embodiments above wherein the sorption particle is capable of chemical adsorption with an undesired material, such as an undesired ion, undesired compound or undesired chemical, the undesired material is removed from a gas stream or fluid stream when contacted with the sorption particle. The article as described in any of the embodiments above wherein the sorption particle is capable of physical adsorption with an undesired material, such as an undesired ion, undesired compound or undesired chemical, the undesired material is removed, from a gas stream or fluid stream when contacted with the sorption particle. The article as described in any of the embodiments above wherein the sorption particle is capable of chelation with an undesired material, such as an undesired ion, undesired compound or undesired chemical, the undesired material is removed from a gas stream or fluid stream when contacted with the sorption particle. The article as described in any of the embodiments above wherein the sorption particle is capable of catalysis with an undesired material, such as an undesired ion, undesired compound or undesired chemical, the undesired material is removed from a gas stream or fluid stream when contacted with the sorption particle.

The article as described in any of the embodiments above wherein the sorption particle is an active metal organic framework. The article as described in any of the embodiments above wherein the sorption particle is a catalyst, the catalyst is selected from palladium on carbon, the article with the catalyst is used to remove sulfur compounds from a gas or fluid stream. The article as described in any of the embodiments above wherein the sorption particles are iron oxide, the article with the iron oxide is used to remove phosphates from water.

The article as described in any of the embodiments above wherein the article may optionally comprises calcium carbonate or calcium hydroxide. The article as described in any of the embodiments above wherein the calcium carbonate or calcium hydroxide is located within the channel of the porous polymeric matrix.

The article as described in any of the embodiments above is essentially free of surfactant. The article as described in any of the embodiments above is essentially free of a plasticizer. The article as described in any of the embodiments above is essentially free of polyethylene oxide with an average weight average molecular weight over 500,000.

An article comprising a bicontinuous structure comprising polyvinyl chloride and polyethylene oxide with an average weight average molecular weight from about 1000 to about 100,000 at 10-40 PHR of polyethylene oxide; the article is essentially free of surfactant; the article is essentially free of plasticizer; wherein the bicontinuous structure being capable of becoming a porous polymeric matrix comprising pores with a nominal diameter of 1 nm to 1000 microns.

The process of removing an undesired material from a gas stream or liquid stream comprising passing a gas stream or a liquid stream with a first level of undesired material comprising a polyvinyl chloride porous matrix, the polyvinyl chloride porous matrix comprising an effective amount of a plurality of sorption particles to produce an altered gas stream or liquid stream with a second level of undesired material, the second level of undesired material being less than the first level of undesired material, the first level of undesired material undergoing ion exchange, chemical adsorption, physical adsorption, chelation, catalysis or combinations thereof to result in the second level of undesired material. The article as described in any of the embodiments above.

The process of removing an undesired material from a gas stream comprising passing a gas stream with a first level of undesired material through an article comprising a polyvinyl chloride or chlorinated polyvinyl chloride porous matrix, the porous matrix comprising an effective amount of a metal organic framework to produce an altered gas stream with a second level of undesired material, the second level of undesired material is less than the first level of undesired material. The article as described in any of the embodiments above.

The process of removing an undesired material from a liquid stream comprising passing a liquid stream with a first level of the undesired material through an article comprising a polyvinyl chloride or chlorinated polyvinyl chloride porous matrix, the porous matrix comprising an effective amount of iron oxide to produce an altered liquid stream with a second level of undesired material, the second level of undesired material is less than the first level of undesired material. The article as described in any of the embodiments above.

Example 3: Use of Article Comprising Example 1E (Activated Carbon) to Remove Dye from Water Solution 1. A color scale generated from known concentration of blue dye by using blue food color dye Fd&c Blue 1 (ex Essential Everyday) in deionized water and then diluted by serial dilution.

TABLE 2

| Solution | g H2O | g Dye | Solution # | g Solution | g dye/ mL H2O |
|---|---|---|---|---|---|
| A | 53.2 | 0.235 | 0 | 0 | 4.42E−03 |
| B | 41.9 | — | 1 | 9.8 | 8.37E−04 |
| C | 40.6 | — | 2 | 9.9 | 1.64E−04 |
| D | 39.2 | — | 3 | 10.1 | 3.36E−05 |
| E | 40.6 | — | 4 | 9.8 | 6.54E−06 |
| F | 39.5 | — | 5 | 9.8 | 1.30E−06 |
| G | 38.8 | — | 6 | 11.9 | 3.05E−07 |

2. The stock solution for the absorption test is prepared:
 a) Extraction sample 1 stock solution concentration was made to be 1.7×10-3 (between dilution sample (A) and (B))
 b) Extraction sample 2 stock solution concentration was made to be 2.2×10-5. (Between dilution sample (C) and (D)).
3. Example 1E being tested is activated carbon at 20 PHR (0.5 PHR with respect to the PVC), 80 wt % PVC [ex Axiall 2110, K value of 74], 25 phr PEO [20 wt % with a weight average molecular weight of 3350]. The tested sample is in pellet form.
4. The sample of 0.5 g Example 1E is added into 18 mL of the stock solutions for about 6 days (no mixing and ambient vibrational energy) and then visually compared against color scale under relatively normal lighting conditions. Extraction Sample 1: 0.5 g sample in 17 mL of the extraction solution shown above in Step 2(a). Extraction Sample 2: 0.5 g in 18.4 mL of the extraction solution shown above in Step 2(b).
Extracted Samples 1 and 2 are placed relative to the color chart:
Extracted Sample 1 is between standard dilution samples (B) and (C)
Extracted Sample 2 is from dilution sample (F)-(G), as no color is visually detectable in dilution samples (F), (G) and the extracted sample 2.
Extraction Sample 1 after 6 days resulted in an estimated concentration of about 2.65×10-4 g/mL
Extraction Sample 2 after 6 days resulted in an estimated concentration less than 1.3×10-6 g/mL

Example 4: Phosphate Removal with Iron Oxide or Iron Oxide and Calcium Carbonate as Sorbant Particles

Example 4A (Comparative Example with No Sorbent Particle)

100 PHR PVC [ex Axiall 2110, K value of 74], 25 PHR PECO [weight average molecular weight 3350], 1.25 PHR ascorbic acid

Example 4B—with Iron Oxide

Adding a metal oxide, such as iron oxide to 100 PHR PVC [ex Axiall 2110, K value of 74], 25 PHR PEO) [weight average molecular weight 3350], 2 PHR ascorbic acid and 5 PHR iron oxide (Fe2O3)

Example 4C—with Iron Oxide+Calcium Carbonate

Adding a metal oxide and a buffering particle, such as iron oxide and calcium carbonate to 100 PHR PVC [ex Axiall 2110. K value of 74], 25 PHR PEO [weight average molecular weight 3350], 2 PHR ascorbic acid, 5 PHR iron oxide (Fe2O3) and 5 PHR calcium carbonate.

Testing solution for phosphate removal is shown in Table 3.

TABLE 3

Stock Solution 1

| | |
|---|---|
| 4.277 | g KH2PO4 |
| 310.2 | ml H2O |
| 9622112.844 | mg/L (ppb) |

Samples were added to the Stock Solution, after 6 days to for Stock Solution 2, phosphate levels were measured after serial dilution of the Stock Solution 2A-2C.

Example 4A: 2.0 g pellets in 54.3 mL of Stock Solution 1 (resulting in Stock Solution 2A)

Example 413: 2.0 g pellets in 55.7 mL of Stock Solution 1 (resulting in Stock Solution 2B)

Example 4C: 2.1 g pellets in 41.2 mL of Stock Solution 1 (resulting in Stock Solution 2C)

Phosphate levels were measured using Pool Check™ Phosphate test (suitable for phosphate levels of 0, 200, 400, 600, 1000, 2500 ppb, ex Industrial Test Systems, Inc.). Serial dilution of Stock Solution 2A-2C done to result in about 900 ppb to 9000 ppb mg/L phosphate ions to correlate to the test concentration range. Directions on package were followed for testing. The serial dilution and phosphate testing results are shown below in Tables 4-7.

TABLE 4

Comparative Example without Sample

| Dilution | Of Prior Sol. | Water | M | calculated ppb | estimated with test strip ppb |
|---|---|---|---|---|---|
| 0 (Stock Solution 1) | — | — | 1.013E-001 | 9622113 | — |
| 1 | 9.1 | 82.3 | 1.009E-002 | 958000 | 200 |
| 2 | 9.4 | 84.8 | 1.007E-003 | 95597 | 4000 |
| 3 | 9.7 | 88.6 | 9.933E-005 | 9433 | 4000 |
| 4 | 8.8 | 79.7 | 9.877E-006 | 938 | 500 |
| 5 | 9.1 | 83.1 | 9.748E-007 | 93 | 100 |
| 6 | 10.5 | 94.2 | 9.776E-008 | 9 | 0 |

TABLE 5

Example 4A

| Dilution | Prior Sol. | Water | M | calculated ppb | estimated with test strip ppb |
|---|---|---|---|---|---|
| 0 (Stock Solution 2A) | — | — | 1.013E-001 | 9622113 | — |
| 1 | 8.9 | 82 | 9.920E-003 | 942099 | 200 |
| 2 | 9.1 | 82.9 | 9.812E-004 | 93186 | 1500 |
| 3 | 8.9 | 80.3 | 9.790E-005 | 9298 | 4000 |
| 4 | 10.5 | 95.5 | 9.698E-006 | 921 | 500 |
| 5 | 8.6 | 77.4 | 9.698E-007 | 92 | 100 |
| 6 | 8.6 | 77.7 | 9.664E-008 | 9 | 0 |

TABLE 6

Example 4B

| Dilution | Prior Sol. | Water | M | calculated ppb | estimated with test strip ppb |
|---|---|---|---|---|---|
| 0 (Stock Solution 2B) | — | — | 1.013E-001 | 9622113 | — |
| 1 | 8.5 | 77.8 | 9.979E-003 | 947717 | 100 |
| 2 | 9.6 | 86.8 | 9.938E-004 | 94378 | 4000 |
| 3 | 9.8 | 88.4 | 9.917E-005 | 9419 | 3000 |
| 4 | 9.3 | 88 | 9.479E-006 | 900 | 500 |
| 5 | 8.5 | 76.2 | 9.513E-007 | 90 | 0 |
| 6 | 9.4 | 84.1 | 9.564E-008 | 9 | 0 |

TABLE 7

Example 4C

| Dilution | Prior Sol. | Water | M | calculated ppb | estimated with test strip ppb |
|---|---|---|---|---|---|
| 0 (Stock Solution 2C) | — | — | 1.013E-001 | 9622113 | — |
| 1 | 7.9 | 74.5 | 9.714E-003 | 922508 | 200 |
| 2 | 8.4 | 75.1 | 9.772E-004 | 92803 | 1500 |
| 3 | 8.7 | 78.1 | 9.794E-005 | 9302 | 2000 |
| 4 | 8.1 | 72.4 | 9.855E-006 | 936 | 200 |
| 5 | 9.1 | 82 | 9.844E-007 | 93 | 0 |
| 6 | 8.4 | 75.5 | 9.856E-008 | 9 | 0 |

The phosphate testing range in the serial dilution 3 and 4, which correlate to the testing range of the phosphate test, show no difference in the phosphate levels between the Stock Solution 1 (Table 4) and the Stock Solution 2A (Table 5), which the sample without sorption particles. Tables 6 and Tables 7 in the serial dilution 3 and 4 show a decrease in phosphate levels with the sample with iron oxide and with iron oxide and calcium carbonate.

Similarly, in testing the pH of the Stock Solution 1 and Stock Solutions 2A-2C, the pH was found to increase with the addition of calcium carbonate in Sample 4C showing a pH (basic) effect of the calcium carbonate.

Stock Solution 1—pH=4.6 (no sample)
Stock Solution 2A—pH=4.6 (sample without sorption particles)
Stock Solution 2B—pH=4.6 (iron oxide)
Stock Solution 2C—pH=5.5 (iron oxide and calcium carbonate)

The dimensions and values disclosed herein are not to be understood as being strictly limited to the exact numerical values recited. Instead, unless otherwise specified, each such dimension is intended to mean both the recited value and a functionally equivalent range surrounding that value. For example, a weight percentage disclosed as "5 wt %" is intended to mean "about 5 to 15 wt %."

Every document cited herein, including any cross referenced or related patent or application, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention.

Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

The invention claimed is:

1. An article comprising a bicontinuous structure of polyvinyl chloride or chlorinated polyvinyl chloride and a polyethylene oxide polymer, the polyethylene oxide polymer having an average molecular weight less than 100,000, wherein the bicontinuous structure comprises a nominal channel size of polyethylene oxide polymer between 100 microns and 1 nm, the article further comprising a plurality of sorption particles, the sorption particles are distributed in the polyethylene oxide polymer and the nominal sorption particle size of the plurality of sorption particles is selected to be greater than the nominal channel size, less than the nominal channel size, or the sorption particles are selected so the nominal sorption particle size is selected to be greater and less than the nominal channel size.

2. A process of removing an undesired compound or material from a fluid stream comprising passing a gas stream with the undesired compound through an article according to claim 1.

3. An article comprising a bicontinuous structure of polyvinyl chloride or chlorinated polyvinyl chloride, wherein the bicontinuous structure comprises a nominal channel size between 100 microns and 1 nm, the article further comprises a plurality of sorption particles, the sorption particle is selected from ion exchange, chemisorption, physisorption, chelation, catalysis, or a combination thereof, wherein the nominal sorption particle size of the plurality of sorption particles is selected to be greater than the nominal channel size.

4. The article of claim 3 wherein the sorption particle being present more than 10 PHR of the polyvinyl chloride or chlorinated polyvinyl chloride polymer.

5. The article of claim 3 wherein the sorption particles are present between 10 and 40 PHR of the polyvinyl chloride or chlorinated polyvinyl chloride polymer.

6. The article of claim 3 wherein the sorption particles are presentin less than a hundred PHR of the bicontinous structure and having a nominal sorption particle size of between 1 nm and 100 microns.

7. The article of claim 3 wherein the polyvinyl chloride comprises a K value selected from about 35 and about 80.

8. The article of claim 3 wherein the chlorinated polyvinyl chloride polymer comprises a K value selected from about 50 and about 70 and the chloride content between 60 and about 70%.

9. The article of claim 3 wherein the sorption particles are zirconium propoxide.

10. The article of claim 3 wherein the sorption particles are $Zr(nPrO)4$.

11. The article of claim 3 where the sorption particles are metal oxides.

12. The article of claim 11 wherein the metal oxid is selected from magnesium oxide, manganese oxide, manganese hydroxide, iron oxide, copper oxide, zinc oxide, zirconium oxide, aluminum oxide, and mixtures thereof.

13. The article of claim 3 wherein the sorption particles are alkylenepolyamine polyacetic acids and their salts.

14. The article of claim 3 wherein the sorption particles are active carbon.

15. The article of claim 3 wherein the sorption particles are graphene.

16. The article of claim 3 wherein the sorption particles are a metal oxide and calcium carbonate.

17. The article of claim 3 wherein the sorption particles are a metal oxide and activated carbon.

18. The article of claim 3 wherein the sorption particles are metal-organic framework particles.

19. The article of claim 3 wherein the sorption particles are nanogalvanic particles.

20. The article of claim 3 wherein the sorption particles are selected from calcium carbonate, sodium bicarbonate, calcium phosphates, tricalcium phosphate, carbonated calcium phosphates, magnesium hydroxide, sodium hydroxide, potassium hydroxide, lithium hydroxide; citric acid, oxalic acid, tartaric acid, phtalic acid, acetic acid, benzoic acid, glutaric acid, adipic acid, carbonic acid, and mixtures thereof.

21. The article of claim 3 wherein the sorption particles are antimicrobial particles selected from copper and its sales and complexes, silver and its salt and complexes, and mixtures thereof.

22. The article of claim 21 wherein the antimicrobial particles are selected from copper acetate, copper chloride, copper bromide, copper chlorate, copper perchlorate, copper nitrite and copper nitrate, copper sulfate, and mixtures thereof.

* * * * *